United States Patent [19]

Ehrlinger et al.

[11] Patent Number: 5,251,443
[45] Date of Patent: Oct. 12, 1993

[54] PRESSURE-CONTROL DEVICE

[75] Inventors: Friedrich Ehrlinger, Friedrichshafen; Wilhelm Härdtle, Markdorf; Peter Hartig, Ravensburg, all of Fed. Rep. of Germany

[73] Assignee: Zahnradfabrik Friedrichshafen AG, Fed. Rep. of Germany

[21] Appl. No.: 828,990

[22] PCT Filed: Aug. 22, 1990

[86] PCT No.: PCT/EP90/01394

§ 371 Date: Jan. 30, 1992

§ 102(e) Date: Jan. 30, 1992

[87] PCT Pub. No.: WO91/02913

PCT Pub. Date: Mar. 7, 1991

[30] Foreign Application Priority Data

Aug. 26, 1989 [DE] Fed. Rep. of Germany ....... 3928309

[51] Int. Cl.$^5$ .................. F16D 31/02; F15B 11/00
[52] U.S. Cl. ............................. 60/426; 60/459; 60/468; 91/518; 91/532; 192/85 R; 192/103 F
[58] Field of Search .............. 60/420, 422, 426, 459, 60/468; 91/514, 518, 531, 532; 192/85 R, 87.1, 87.13, 103 F

[56] References Cited

U.S. PATENT DOCUMENTS

| | | | |
|---|---|---|---|
| 3,241,318 | 3/1966 | Rohde | 60/422 |
| 3,962,954 | 6/1976 | Jacob et al. | 91/518 X |
| 4,535,681 | 8/1985 | Nakamura et al. | 91/531 X |
| 4,616,671 | 10/1986 | Steinkuhl et al. | 60/422 X |
| 4,658,705 | 4/1987 | Maeda | 91/518 |
| 4,684,004 | 8/1987 | Stark | 192/87.13 |
| 4,739,617 | 4/1988 | Kreth et al. | 60/426 |
| 5,072,814 | 12/1991 | Hama et al. | 192/85 R X |

FOREIGN PATENT DOCUMENTS

| | | |
|---|---|---|
| 1650928 | 12/1970 | Fed. Rep. of Germany . |
| 0191304 | 11/1983 | Japan ........................ 91/531 |
| 2082272 | 3/1982 | United Kingdom . |

*Primary Examiner*—Edward K. Look
*Assistant Examiner*—Hoang Nguyen
*Attorney, Agent, or Firm*—Davis, Bujold & Streck

[57] ABSTRACT

In a pressure-control device for affecting the closing behavior of powershift clutches ($K_1 - K_X$) in a powershift transmission, a regulating valve (1) cooperates with a damping device (2) as pressure-control valve. Chokes (4, 40, 400) for a more or less smooth connection are arranged in combination with pressure lines ($P_S$, $P_R$) over the pressure cycle when the clutch concerned ($K_1 - K_X$) is engaged. The travel of the damper piston (21) in a direction toward the regulating valve (1) is shortened by a pressurizing piston device (3) cooperating with the piston (21) of the damping device (2). Thus the time for the slipping phase in the engaged clutch concerned is shortened and, together with a higher initial pressure after the clutch is filled, the friction is limited. The limitation of the friction can also be obtained by adding a second choke in parallel in the control pressure line (Pr) by which the choked cross section is increased.

13 Claims, 3 Drawing Sheets

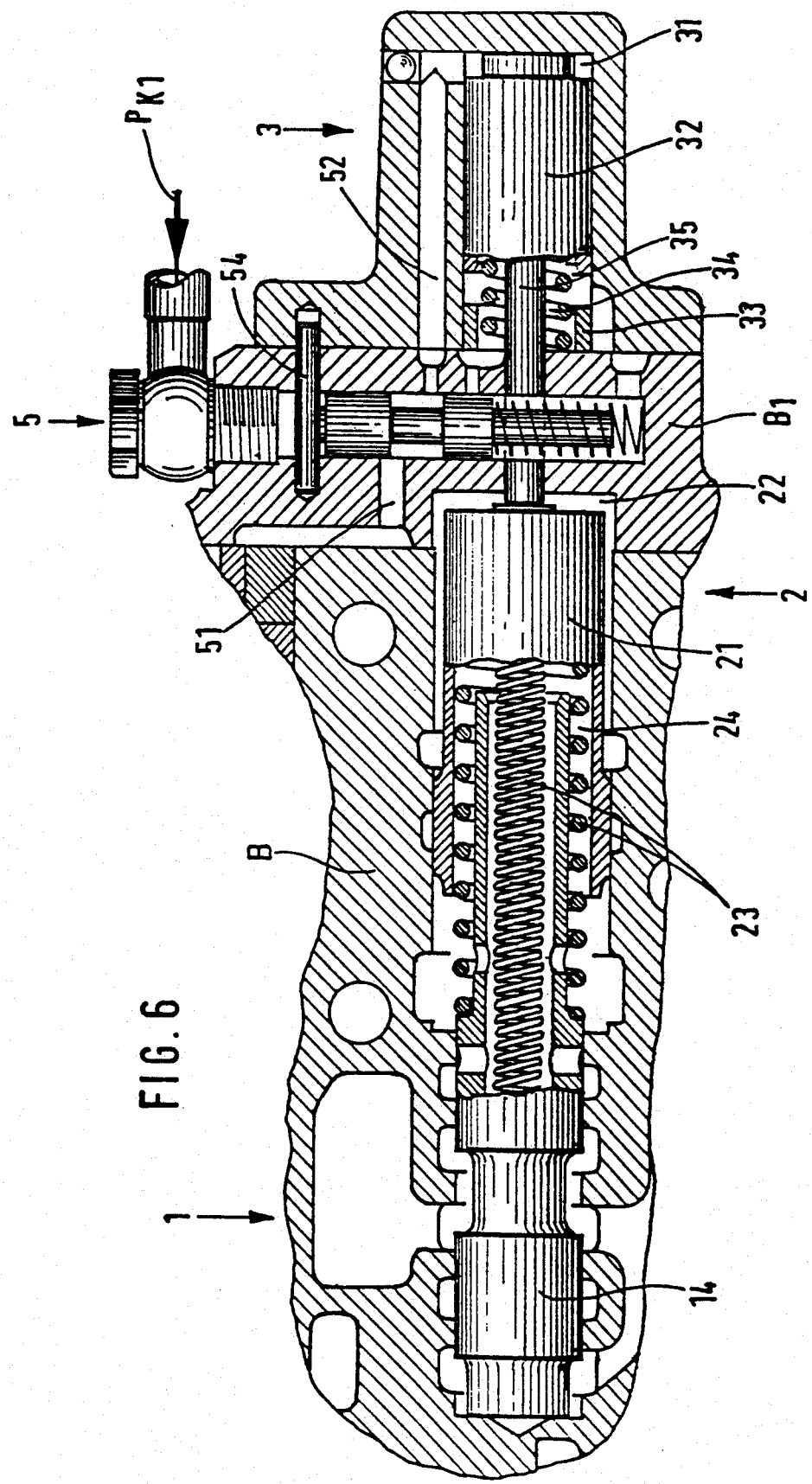

PRESSURE-CONTROL DEVICE

The invention concerns a pressure-control device to affect the engaging behavior of powershift clutches in a powershift transmission having a regulating valve that cooperates with a damping device to act as a pressure-control valve, combined with chokes arranged in pressure lines, through which the pressure cycle is determined for a more or less smooth connection when the clutch concerned is engaged.

Such a pressure-control valve has been disclosed in DE-C 16 50 928 wherein the regulated pressure is fed only to the powershift clutch. The control piston, which regulates the system pressure for clutch control, is affected by both the regulated pressure for the clutch and the action of the damper piston which is in connection with a compression spring that acts contrary thereto and is affected by the regulated and choked pressure acting on said damper piston. Therefore, after filling the clutch, a pressure which is proportional to the prestress of the spring situated on the damper piston first appears. As a consequence of the pressurized oil that flows via the chokes into the piston space of the damper and of the diameter of the damper piston which is larger compared to that of the valve slide, the damper piston moves further in the direction of the valve slide and prestresses the spring further. The pressure cycle in the clutch then corresponds to said spring prestress.

Except for the load-depending pressure, all the parameters that affect the pressure cycle in the clutch are structurally conditioned and therefore established. This is advantageous and also is beneficial when specific pressure-control valves whose dimensions have been optimized in tests are coordinated with the clutches. But it is not possible to further affect the pressure cycle in the clutch, especially in connection with the slipping time.

Therefore, the problem to be solved by the invention is to develop further a pressure-control valve according to the preamble of claims 1 and 9 in the sense that the slipping time and the clutch pressure can be further controlled, such as for different gear changes.

This problem is solved by the characteristic features of claims 1 and 9. With a defined displacement of the damper piston to the control valve, the spring on the damper piston becomes increasingly prestressed so that after the filling of the clutch to be engaged, a higher initial pressure results for an abrupter connection which, due to a shorter distance traveled and also a shorter time. Accordingly, it is possible, with only one pressure-control valve, to accomplish both smooth connections—without action of the pressurized piston device and with a lower initial pressure and longer slipping time of the clutch—and an abrupt connection 13 by raising the initial pressure and shortening the slipping time. In a simple manner, the pressurized piston device is activated by a precontrol valve which always feeds the system pressure to the piston space of the pressurized piston device for accomplishing a shortened slipping time and an abrupt connection. The precontrol valve is shifted by the pressure in a selected clutch so that the piston space of the pressurized piston device is vented and the whole damper travel makes possible a smooth connection at a low initial pressure. The slipping time still remaining, in the case of an abrupt connection and a defined higher initial pressure, can be minimized in a simple manner with an adjusting device such as a spacer ring. If an expanding valve is added through which the regulating pressure is passed into the spring space of the damping device, resetting of the damper piston and eventually of the pressurized piston can be quickly accomplished for a quicker shift sequence.

The slipping time of a powershift clutch can be strongly affected by the arrangement of chokes through which can be determined the speed of the piston of the damping device. If at least one of the chokes is arranged to be engageable and disengageable, the slope of the pressure-cycle curve can be modifiably designed. A uniform but also reduced pressure-cycle curve can be obtained and a second choke, for instance, can be engaged and disengaged via a shift valve, but also in a very simple manner via an additional leading edge for the regulating pressure on the piston of the damping device.

The present invention is not limited to the combination of features in the claims. Other logical possible combinations will result for an expert from the claims and the separate features of the claims in accordance with the existing problem.

Other details of the invention are explained with reference to the drawings and the embodiments. In the drawings:

FIG. 6 shows as a segment the two-stage pressure-control valve in a valve block.

Figure 1:
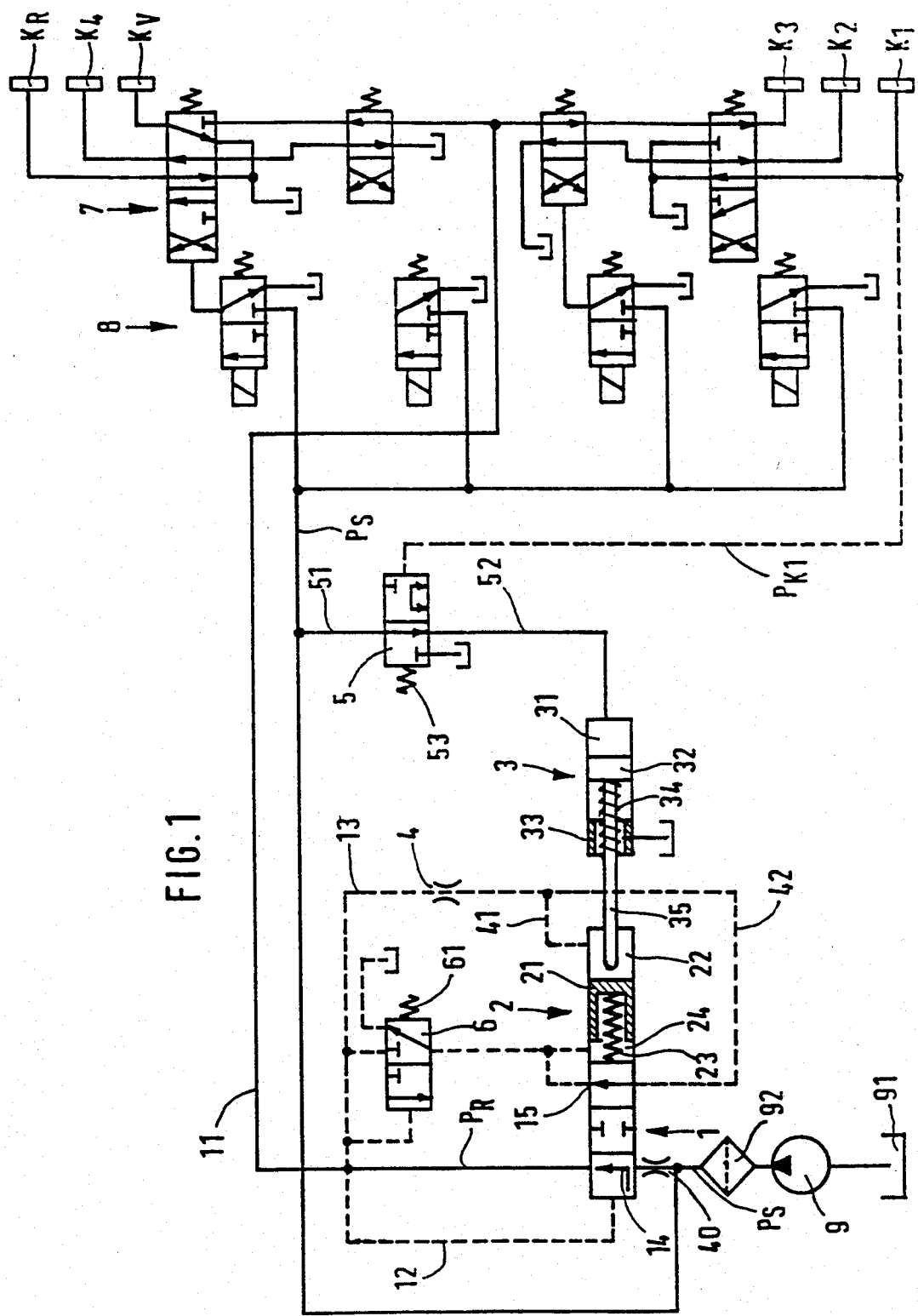
FIG. 1 shows a simplified diagrammatic illustration of a control for a reversing transmission in the area of the clutches to be engaged.
Figure 2:
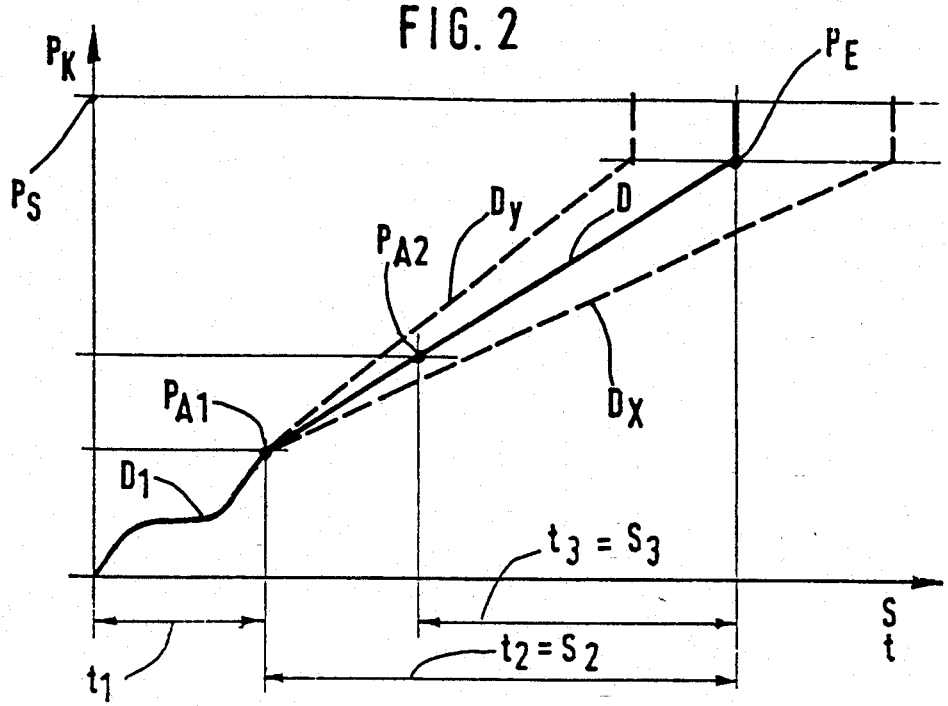
FIG. 2 shows the pressure cycle through time when load is assumed in a clutch.

Shown in FIG. 1 is a two-stage pressure-control valve with a regulating valve 1, a damping device 2 (displacement piston device) and a pressurized piston device 3. Pressurized oil is absorbed in a manner known in the art via a sump 91 of the powershift transmission and is fed through a filter 92 as system pressure $P_S$ via a choke 40 to the regulating valve 1 and fed unchoked to setting adjusting valves 7 for the clutches $K_1$ to $K_4$, $K_V$, and $K_R$ via a solenoid valve 8. A precontrol valve 5 also has, via the line 51, a connection to the system pressure which in a normal position of the precontrol valve 5, that is, under the action of the spring 53, is passed via a line 52 into a piston space 31 of the pressurized piston device 3. An inverted arrangement of the precontrol valve is also conceivable in which the latter is always locked by the pressure of the spring and is only engaged by the pressure $P_{K2}$-$K_4$ of one of the clutches $K_2$ to $K_4$ and the piston space 31 of the pressurized piston device 3 is filled. The pressure $P_R$ regulated by the pressure-control valve—regulating valve 1, damping device 2 and pressurized piston device 3—is fed after each engagement of the solenoid valve for filling and engaging the respective gearshift clutches $K_1$ to $K_4$, $K_R$, $K_V$ of the gears 1 to 4 and the forward and reverse gears. The regulating pressure $P_R$ is passed via the line 12 to the end face of the piston 14 of the regulating valve 1 and via a line 13 and a choke 4, the same as the line 41, into the piston space 22 of the damper piston 21. The regulating pressure, also choked by the choke 4, is fed via a line 42 to another leading edge 15 of the regulating valve 1. In the unchoked regulating pressure line 13, an expanding valve 6 is situated which is controlled by the regulating pressure $P_R$ against the pressure of a spring 61. When in the filling and slipping phase, a spring space 24 is vented via the expanding valve, said space is then filled at a defined regulating pressure after termination of the slipping phase. This pressure accelerates the return of the damper piston 21 and the pin 35 as well as the piston 32 of the pressurized piston device 3. In the pressurized piston device 3, an adjusting device 33 is disposed in the form of a spacer ring in this embodiment. The remaining slipping phase and the higher initial pressure for an abrupt shortened connection is determined via said ring. In FIG. 2, the clutch pressure $P_K$ is plotted against the travel S of the displacement piston or damper piston, said travel length being proportional to a corresponding starting time. The pressure cycle D is composed of the filling phase $D_1$ of the clutch $K_1$ and the actual curve of the pressure cycle, the slope of said curve being substantially affected by the choke 4 situated in the regulating pressure line 13. In the case of a small choke, a flat curve $D_X$ results and in the case of a large choke, a steeper curve $D_Y$ results. The slipping phase of the clutch $S_2$, which in the case of a smooth connection begins after the filling phase $t_1$ with an initial pressure $P_{A1}$, as can be well understood, is substantially longer than the slipping phase $S_3$ starting from the initial pressure $P_{A2}$. The connection is terminated, for instance, at 12 bar when the system pressure, such as $P_s$, amounts to 15 bar.

Figure 3:
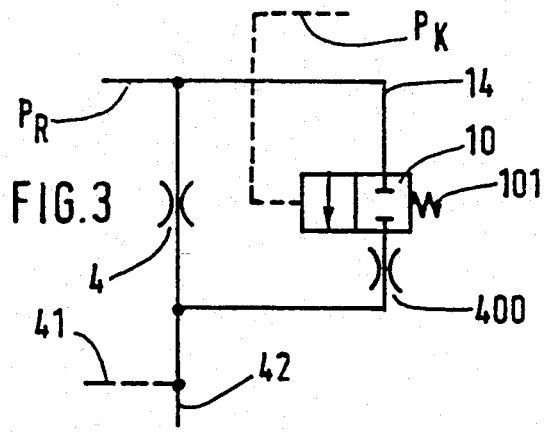
FIG. 3 shows a control device according to FIG. 1 in another design.

FIG. 3 shows a possible extension of FIG. 1 where, by arranging a shiftable second choke 400, the slope of the pressure-cycle curve D, $D_Y$, and $D_X$ can be changed from the beginning—immediately after the filling phase $D_1$—but also from just after expiration of part of the pressure cycle D.

To that end, in the regulating pressure line $P_R$, a second choke 400 is added and disposed parallel to a first choke 4. The line 14, having a regulating pressure $P_R$ to said choke 400, can be opened or closed by a shift valve 10 and, as shown in FIG. 3, the locking position can be accomplished by a spring 101 and the engaged position adjusted by the pressure $P_K$ of a selected clutch K. In the engaged position, the parallel choke cross sections are added in the regulating pressure line $P_R$ so that the damper piston 21 is moved toward the regulating valve 1 faster and the slipping and the starting time $t_2$, $t_3$ are shortened, which is shown by a steeper pressure-cycle curve such as $D_Y$.

Figure 4:
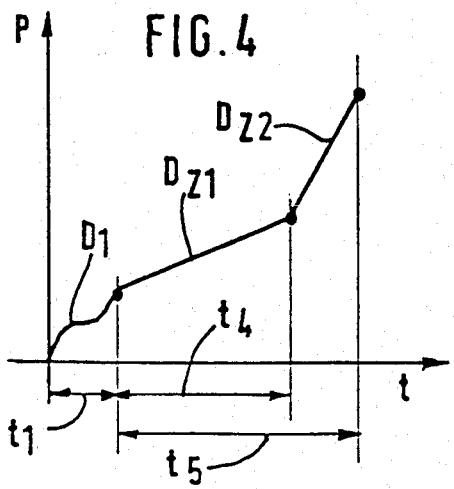
FIG. 4 shows the pressure cycle according to FIG. 2 in another variant.
Figure 5:
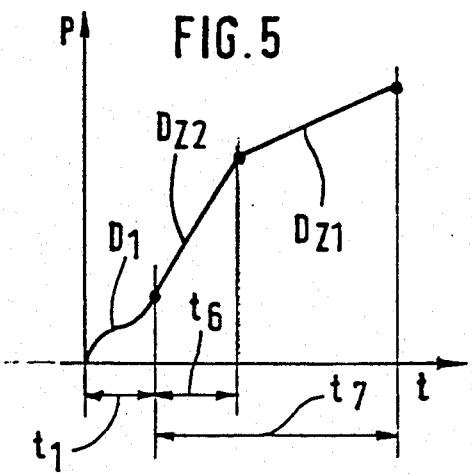
FIG. 5 shows the pressure cycle according to FIG. 2 in another variant.

The shift valve 10 can be engaged immediately after the filling phase $D_1$ so that a pressure-cycle curve D, $D_Y$ which uniformly rises over the whole starting time results. If the second choke 400 is connected just after the end of part $t_4$ of the starting time $t_5$, pressure-cycle curves of different slopes $D_{Z1}$, $D_{Z2}$ result—the pressure-cycle curves according to FIG. 4. The engagement of the second choke 400 is also irreversible, the second choke being engaged immediately after the filling phase $D_1$ and disengaged after a lapse of a partial starting time $t_6$, the pressure-cycle curve according to FIG. 5. The shift valve 10 for engaging and disengaging the second choke 400 in the regulating pressure line $P_R$ can be arranged in addition to the arrangement of a pressurized piston device 3 or instead thereof.

The second choke 400 can be controlled in a simplified manner by an additional leading edge on the piston 21 of the damping device 2 in combination with the regulating pressure line $P_R$.

The two-stage pressure-control valve operates as follows. In reversing operations from the 2nd forward to the 2nd reverse gear and vice versa, said operations must develop with an abrupt connection characteristically at a high pressure level whereby the shift energy is limited. In said gearshift operation, the two-stage pressure-control valve, which consists of the regulating valve 1, the damping device 2 and the pressurized piston device 3, is in a position for abrupt engagement. The precontrol valve 5 is in the position shown in FIG. 1 in which the piston space 31 of the pressurized piston device 3 is actuated with system pressure $P_S$. The piston 32 moves via the pin 35 of the damper piston (displacement piston 2) in the direction toward the regulating valve and thus increases the prestress of the spring 23 between damper piston 21 and regulating valve 1. Said prestressing is terminated by an adjusting device 33, an adjusting ring in this embodiment. The initial point of the pressure-control cycle over said adjusting ring begins at point $P_{A2}$ in a gear shift from the 2nd forward gear to the 2nd reverse gear. The damper piston 21 now moves via the action of the regulating pressure $P_R$ in the line 13, and taking into consideration the choke 4 actuated by pressure in the piston space 22 via the line 41 to the regulating valve, and the prestress of the spring 23 is continuously increased. At the point $P_E$ of FIG. 2, the damper piston 21 has mounted the regulating valve, and the system pressure $P_S$ is reached in the line 11, which leads from the regulating valve 1 to the directional valves 7 of the clutches $K_1$–$K_X$. During said pressure increase, the expanding valve 6 is shifted by said relatively high pressure against the action of the spring 61 so that, with nearly system pressure, the damper piston 21 and the pressurized piston device 3 are pressed back to the initial position. The recoil springs 34 in the pressurized piston device and 23 on the damper piston 2 are supported by said pressure in the spring space 24 of the damper piston, it is also possible to eliminate entirely the recoil spring 34 in the pressurized piston device. For a gearshift, for instance, from the 1st forward gear to the 1st reverse gear or vice versa, the clutch $K_1$ is actuated with pressure via the coordinated directional valve 7 and thus the precontrol valve 5 is shifted via the line $P_{K1}$ into a position, not shown, in which the system pressure is shut off and the line 52 is vented toward the piston space 31 of the pressurized piston device 3. The damper piston 21 of the damping device 2 remains in the end position to the right so that the pressure control begins after the filling phase at point $P_{A1}$, that is at a substantially lower pressure, and thus engagement is smoother and also takes more time. The remaining course is the same as explained already in a position of the pressure-control valve for abrupt shifting, for example, in a gear shift from 2R to 2V. For a smooth shift of the pressure-control valve in which the precontrol valve is vented by the pressure $P_{K1}$ of the clutch of gear 1, it also is important that the pressure be maintained during the entire gear shift. The precontrol valve 5 shifts the clutch $K_1$, for instance, at a pressure of approximately 8 bar so that a gear shift from 2V to 1V or also from 2R to 1R develops with the characteristically abrupt engagement, since the gear shift has been terminated before the precontrol piston 3 reverses. Said gear shifts can be affected by varying the pressure. Gear shifts from 2V to 1R or 2R to 1V can likewise be developed with an abrupt engagement.

When arranging a second choke 400 such as in FIG. 3, the action on the pressure cycle for the powershift clutches $K_1$, $K_X$ is as follows. If the choke 400 is engaged immediately after the filling $D_1$ of a clutch, different pressure-cycle curves D, $D_Y$, $D_X$ (FIG. 2) can be obtained for different clutches dependent on shift parameters $P_K$. The initial pressure $P_A$ is always the same when the starting time affects only the choke 4. When combined with the two-stage pressure-control valve—that is, with the additional arrangement of a pressurized piston device 3—different initial pressures $P_{A1}$, $P_{A2}$ can also be obtained. Depending upon the engaging and disengaging moment of the second choke 400, reduced pressure-cycle curves can be obtained as already described with different slopes $D_{Z1}$, $D_{Z2}$.

In a section of the valve block B shown in FIG. 6, the regulating valve 1 and the damping device 2—displacement piston device—coaxially thereto are specially arranged. In a particularly advantageous manner, the pressurized piston device 3 and the precontrol valve 5 are situated in or on a cover $B_1$ of said control block B so that the pressurized piston device 3 is coaxial with the damping device 2 and the precontrol valve forms a 90° angle therewith. As a consequence of this favorable arrangement of the pressurized piston device and the precontrol valve, favorable mechanical connections to the damping device via the pin 35 from the piston 32 of the pressurized piston device 3 results. Besides, the hydraulic lines of the system pressure $P_S$, of which 51 leads to the precontrol valve and 52 from the precontrol valve 5 to the piston space 31, can be specially and easily arranged in the housing of the cover $B_1$ of the control block B. In this figure, the adjusting device 33 of the pressurized piston device 3 is well recognizable as an adjusting ring. The piston 32 rests thereon and, as consequence of the established height of the ring 33, limits the prestress of the damping device 2. For resetting the piston 32 when the piston space 31 is vented, a spring 34 is additionally disposed. The piston 21 of the damping device 2 also has adequate recoil springs 23 which contribute to the expansion between both of the pistons 14 of the regulating valve and 21 of the damping device.

Reference numerals 1 regulating valve
11-14 line
14 piston
15 leading edge
2 damping device/displacement piston device
21 piston
22 piston space
23 spring
24 spring space
3 pressurized piston device
31 piston space
32 piston
33 adjusting device/ring
34 spring
35 pin
4,40,400 chokes
41 line
42 line
5 precontrol valve
51 line
52 line
53 spring
54 stop
6 expansion valve
61 spring
7 directional valves
8 solenoid valve
9 pump
91 sump of transmission
92 filter
10 shift valve
101 spring
$K, K_1-K_X$ clutches
$K_1-K_4$ clutches of gears 1-4
$K_V$ forward clutch
$K_R$ reverse clutch
s travel
$s_2$ travel of damper piston with soft characteristic
$s_3$ travel of damper piston with hard characteristic
t starting time
B control block/valve block
$B_1$ cover
$t_1$ filling time
$t_2$ starting time
$t_3$ starting time
$t_4$ partial starting time
$t_5$ starting time
$t_6$ partial starting time
$t_7$ starting time
$P_E$ end pressure
$P_S$ system pressure/system pressure line
$P_R$ regulating pressure/regulating pressure line
$P_{A1}$ initial pressure
$P_{A2}$ initial pressure
$P_{K1}$ pressure signal of clutch 1
D pressure-cycle curve
$D_1$ filling phase of the clutch
$D_X$ pressure-course curve with small blind
$D_Y$ pressure-course curve with large blind
$D_{Z1}$ pressure-course curve with different slope
$D_{Z2}$ pressure-course curve with different slope

We claim:

1. A pressure-control device, for controlling engagement of a plurality of powershift clutches (K1-KX) of a powershift transmission, comprising:
    a regulating valve (1) being connected to a supply of pressurized fluid via a system pressure line ($P_S$), the regulating valve (1) containing a control piston (14) for controlling flow of pressurized fluid therethrough to a regulated pressure line ($P_R$), the regulated pressure line being connected to the plurality of powershift clutches (K1-KX) to supply pressurized fluid thereto;
    a damping device (2), containing a damper piston (21), interacting with the regulating valve (1) and functioning as a pressure-control valve, when a desired one of the plurality of powershift clutches (K1-KX) is engaged, through which a pressure cycle for a more or less smooth gearshift is established; and
    at least one choke (4, 40) being situated in at least one of the regulated and the system pressure lines ($P_R$, $P_S$), and the system pressure line being connected to a valve mechanism for controlling the flow of pressurized fluid from the regulated pressure line ($P_S$) to the plurality of powershift (K1-KX) clutches;
    wherein a pressurized piston device (3) is directly connected to the system pressure line ($P_S$) and interacts with the damper piston (21) of the damping device (2), and travel of the damper piston (21)

in a direction toward the regulating valve (1) and thus also the time for a slipping phase in the desired one of the plurality of powershift clutches (K1-KX) to be engaged is shortened and, in combination with a high initial pressure ($P_{A2}$) after filling the desired one of the plurality of powershift clutches ($K_2$-$K_4$) to be engaged, results in a reduction in friction.

2. A pressure-control device according to claim 1, wherein a precontrol valve (5) is provided in the system pressure line ($P_S$) to control the flow of pressurized fluid from the supply of pressurized to a piston space (31) of the pressurizing piston device (3), the pressurizing piston device (3) further contains a pressurized piston (32) having one end thereof communicating with the piston space (31), and the pressurized piston (32) is directly connected with the damping piston (21).

3. A pressure-control device according to claim 2, wherein the pressurizing piston device (3) further contains an adjustment device (33), and travel of the pressurized piston (32) in a direction away from the piston space 931) is limited by the adjustment device (33).

4. A pressure-control device, for controlling engagement of a plurality of powershift clutches (K1-KX) of a powershift transmission, comprising:

a regulating valve (1) being connected to a supply of pressurized fluid via a system pressure line ($P_S$), the regulating valve (1) containing a control piston (14) for controlling flow of pressurized fluid therethrough to a regulated pressure line ($P_R$), the regulated pressure line being connected to the plurality of powershift clutches (K1-KX) to supply pressurized fluid thereto;

a damping device (2), containing a damper piston (21), interacting with a regulating valve (1) and functioning as a pressure-control valve, when a desired one of the plurality of powershift clutches (K1-KX) is engaged, through which a pressure cycle for a more or less smooth gearshift is established; and at least one choke (4, 40) being situated in at least one of the regulated and the system pressure lines ($P_R$, $P_S$), and the system pressure line being connected to a valve mechanism for controlling the flow of pressurized fluid from the regulated pressure line ($P_S$) to the plurality of powershift (K1-KX) clutches;

wherein a pressurized piston device (3) is directly connected to the system pressure line ($P_S$) and interacts with the damper piston (21) of the damping device (2), and travel of the damper piston (21) in a direction toward the regulating valve (1) and thus also the time for a slipping phase in the desired one of the plurality of powershift clutches (K1-KX) to be engaged is shortened and, in combination with a high initial pressure ($P_{A2}$) after filling the desired one of the plurality of powershift clutches ($K_2$-$K_4$) to be engaged, results in a reduction in friction;

a precontrol valve (5) is provided in the system pressure line ($P_S$) to control the flow of pressurized fluid from the supply of pressurized fluid to a piston space (31) of the pressurizing piston device (3);

the pressurizing piston device (3) further contains a pressurized piston (32) having one end thereof communicating with the piston space (31);

the pressurized piston (32) is directly connected with the damping piston (21); and the precontrol valve (5), when in a first position, allows flow of system pressurized fluid therethrough and, when biased into a second position via pressurized fluid ($P_{K1}$) from a desired one of the plurality of clutched ($K_1$), vents the piston space (31) of the pressurized piston device (3).

5. A pressure-control device according to claim 2, wherein when the precontrol valve (5) is shifted into a first position, via pressurized fluid ($P_{K2}$-$K_4$) from one of the clutches ($K_2$-$K_4$), the piston space (31) of the pressurized piston device (3) is filled with pressurized fluid from the supply of pressurized fluid.

6. A pressure-control device according to claim 4, wherein the at least one choke (4) is positioned in the regulated pressure line to establish a starting time (6) for moving the damper piston (21) toward the regulating valve (1) against a spring (23) located in the damping device (2).

7. A pressure-control device according to claim 6, wherein an expansion valve (6) is provided in the regulated pressure line ($P_R$) through which a spring space (24) of the damping device (2), located between the regulating valve (1) and the damper piston (21), is actuated with pressurized fluid when a gearshift of a desired one of the plurality of powershift clutches (K1-KX) is terminated so that the damper piston (21) and the pressurized piston (32) are quickly returned back to their initial positions to be ready for another gearshift.

8. A pressure-control device according to claim 7, wherein:

the regulating valve (1), the damping device (2) and the pressurized piston device (3) form a two stage pressure-control valve (1, 2, 3);

pressurized fluid from the system pressure line ($P_S$) is fed to the regulating valve (1) of the two stage pressure-control valve (1, 2, 3) via s system pressure choke (40) and is then fed directly to the precontrol valve (5), the spring (23) located in the damping device (2) is a compression spring situated between the damper piston (21) and the regulating valve (1);

the pressurized piston (32) of the pressurized piston device (3), when actuated with pressurized fluid from the system pressure line ($P_S$), is biased toward the damper piston (21) and adjusts said damper piston via a transmission pin (35) and against a spring prestress (spring 34) in the pressurized piston device (3) located therebetween, and axial movement of the damper piston (21) in a direction toward the regulating valve (1) is limited via an adjusting device (33) in the pressurized piston device (3);

the pressurized fluid adjusted by the two stage pressure-control valve (1, 2, 3) is fed via at least one directional valve (7) to the desired one of the plurality of powershift clutches (K1-KX) via the regulated pressure line (11) and is fed as a regulating parameter via the regulated pressure line (12) to the regulating valve (1);

the fluid pressure regulated by the two stage pressure-control valve (1, 2, 3)is fed, via the regulated pressure line (13) and a regulated choke (4), to a piston space (22) of the damping device (2) to bias the damper piston (21) toward the regulating valve (1);

a system pressure line (52) is connected between the precontrol valve (5) to the piston space (31) of the pressurized piston device (3), when the precontrol valve (5) is in its first position, the piston space (31) of the pressurized piston device (3) is actuated with system pressure ($P_S$) and, when the precontrol valve (5) is shifted to its second position, the piston space (31) of the pressurized piston device (3) is vented;

a control line (PK1) is situated between the powershift clutch ($K_1$) of the first gear and the precontrol valve (5) through which, when the first gear is engaged, pressurized fluid acts against pressure of a spring (53) to shift the precontrol valve (5) to the second position;

an expansion valve (6) is situated in the regulated pressure line ($P_R$) and is biased by a spring (61), when the expansion valve is in an unengaged position the spring space (24) of the damping device is vented and when the expansion valve is in an engaged position, the spring space (24) is supplied with pressurized fluid ($P_2$) from the regulated pressure line.

9. A pressure-control device, for controlling engagement of a plurality of powershift clutches (K1-KX) of a powershift transmission, comprising:

a regulating valve (1) being connected to a supply of pressurized fluid via a system pressure line ($P_S$), the regulating valve (1) containing a control piston (14) for controlling flow of pressurized fluid therethrough to a regulated pressure line ($P_R$), the regulated pressure line being connected to the plurality of powershift clutches (K1-KX) to supply pressurized fluid thereto;

a damping device (2), containing a damper piston (21), interacting with the regulating valve (1) and functioning as a pressure-control valve, when a desired one of the plurality of powershift clutches (K1-KX) is engaged, through which a pressure cycle for a more or less smooth gearshift is established; and at least one choke (4, 40) being situated in at least one of the regulated and the system pressure lines ($P_R$, $P_S$), and the system pressure line being connected to a valve mechanism for controlling the flow of pressurized fluid from the regulated pressure line ($P_S$) to the plurality of powershift (K1-KX) clutches;

wherein a pressurized piston device (3) is directly connected to the system pressure line ($P_S$) and interacts with the damper piston (21) of the damping device (2), and travel of the damper piston (21) in a direction toward the regulating valve (1) and thus also the time for a slipping phase in the desired one of the plurality of powershift clutches (K1-KX) to be engaged is shortened and, in combination with a high initial pressure ($P_{A2}$) after filling the desired one of the plurality of powershift clutches ($K_2$-$K_4$) to be engaged, results in a reduction in friction; and at least two chokes (4, 400) are situation parallel to each other in the regulated pressure line ($P_R$), at least one of those two chokes (400) is engageable and disengageable via a shifting device (10, 21) so that, in the regulated pressure line leading to a piston space (22) of the damping device (2), different choke cross sections are available whereby different starting times (t) for a desired one of the plurality of powershift clutches ($K_1$-$K_X$) is obtained.

10. A pressure-control device according to claim 9, wherein the shifting device is a shift valve (10) provided in the regulated pressure line ($P_R$) and controlled via fluid pressure from a desired one of the plurality of clutches (K).

11. A pressure-control device according to claim 9, wherein one of the at least two chokes (400) communicates with an end face of the damper piston (21) of the damping device (2).

12. A pressure-control device according to claim 8, wherein a control block (B) houses the regulating valve (1), the precontrol valve (5), the pressurized piston device (3), the adjusting device (33) and the damping device (2).

13. A pressure-control device according to claim 12, wherein the control block (B) includes a cover (B1), the precontrol valve (5) and the pressurized piston device (3) are located within the cover (B1), and the pressurized piston device (3) is coaxially aligned with the regulating valve (1) and the damping device (2) which are located within the control block (B).

* * * * *